May 25, 1937.    G. T. McCLURE    2,081,462
CHECK VALVE DEVICE
Filed March 21, 1936
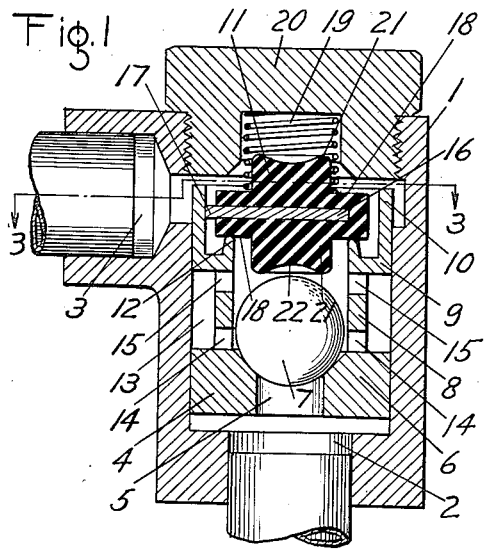
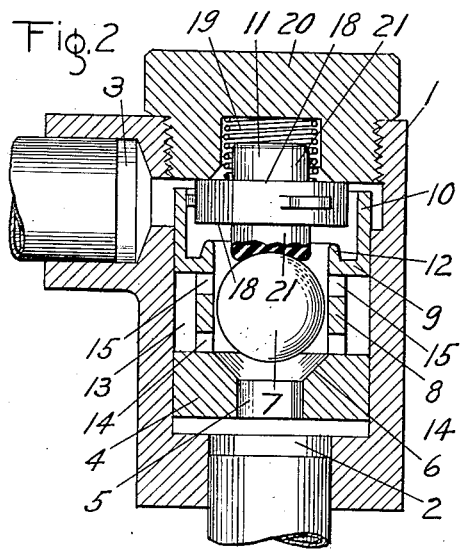
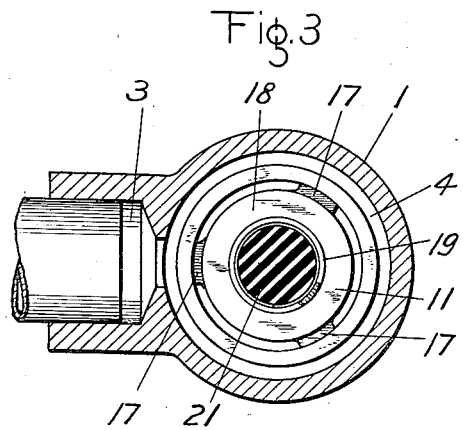
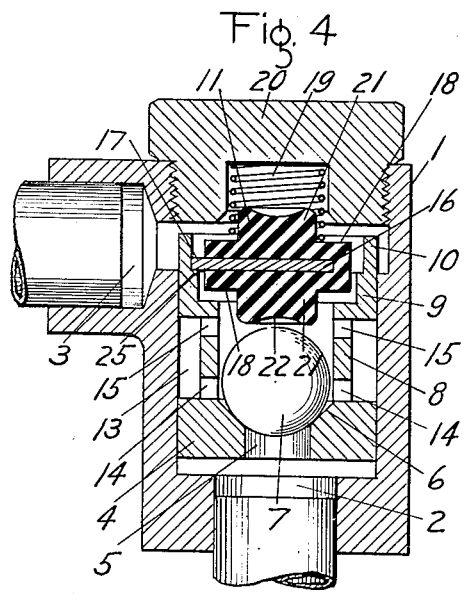
INVENTOR
GLENN T. McCLURE
BY Wm. N. Cady
ATTORNEY Patented May 25, 1937

2,081,462

UNITED STATES PATENT OFFICE 2,081,462

CHECK VALVE DEVICE

Glenn T. McClure, McKeesport, Pa., assignor to The Westinghouse Air Brake Company, Wilmerding, Pa., a corporation of Pennsylvania Application March 21, 1936, Serial No. 70,121

11 Claims. (Cl. 277—42)

This invention relates to ball valve devices and more particularly to ball check valve devices such as may be employed in uni-flow passages of fluid pressure equipments such, for example as fluid pressure brake apparatus.

It is well known that fluid flowing past a ball check valve has a tendency to rotate or spin the ball valve in one direction or another and that the valve as it thus spins strikes the wall of the valve chamber and produces an objectionable humming noise and also wears away and weakens the wall with which it comes in contact. By reason of this action the ball valve is liable to be damaged to such an extent that it will not properly engage its seat.

The principal object of the invention is to provide an improved ball check valve device which will provide for the desired flow of fluid past the ball valve and yet be free from the above mentioned characteristics.

Other objects and advantages will appear in the following more detailed description of the invention.

In the accompanying drawing, Fig. 1 is a vertical sectional view through a double check valve device embodying the invention, the check valves being shown seated; Fig. 2 is a similar sectional view showing the check valves unseated; Fig. 3 is a cross sectional view taken on the line 3—3 of Fig. 1; and Fig. 4 is a vertical sectional view through a single check valve device embodying the invention, the check valve being shown seated.

As shown the check valve device may comprise a casing 1 having a bore which at one end is in communication with an inlet passage 2 and at the other end with an outlet passage 3.

Contained in the bore is a bushing or valve cage 4 which has a press fit with the inner wall of the casing. The lower end of the bushing is provided with a passage 5 which is in constant open communication with the inlet passage 2 and is provided with a valve seat 6 which encircles the passage 5 and which is adapted to be engaged by a ball valve 7 which is slidably guided in a tubular portion 8 of the bushing, which tubular portion extends upwardly from the outer edge of the valve seat. There is a slight clearance between the outer surface of the ball valve and the inner surface of the tubular portion 8 to insure free movement of the ball valve relative to the bushing. This clearance space is so slight that when the valve is raised from its seat by fluid flowing from the inlet passage 2, the flow of fluid past the ball valve, by way of this space, will be negligible.

The outer surface of the tubular portion 8 of the bushing is of less diameter than the bore in the casing and at its upper end is integrally connected, through annular wall 9, to an upwardly extending sleeve portion 10 having press fit with the casing as shown which sleeve portion acts as a guide for a member or check valve 11 which is adapted to engage an annular seat rib 12 extending upwardly from the annular wall 9 of the casing.

From an inspection of Fig. 1 of the drawing it will be seen that the inner surface of the bore in the casing, the outer surface of the tubular portion 8 of the bushing, the bottom portion of the bushing and the wall 9 define a chamber 13 which is open to the interior of the portion 8 by way of a plurality of inlet and outlet ports 14 and 15, respectively, the inlet ports being at the bottom of the tubular portion and the outlet ports being at the top of the tubular portion.

The check valve 11 may comprise a flat metal disk 16 around which is molded a rubber composition or the like, the disk having guide lugs 17 which project through the composition and which are adapted to slidably contact the inner surface of the bushing sleeve 10.

At each side of the disk 16 the rubber composition is provided with an annular flat surface 18 which at one side is adapted to seat on the seat rib 12 and at the other side forms a seat for one end of a spring 19 which, at all times, tends to urge the valve to its seat as shown in Figs. 1 and 3. The other end of the spring seats on a cap nut 20 which has screw-threaded connection with the casing and which closes the open end of the bore in the casing.

Centrally of the disk and on each side thereof, the rubber composition forms a projection 21 which has formed in the end thereof a concave recess 22 adapted to accommodate a portion of the ball valve 7.

As shown the valve 11 is made identical on both sides for the purpose of making it impossible to improperly install the valve, and for the purpose of permitting the reversal of the valve in the event of damage or undue wear of the projection 19 by the ball valve 7.

In operation when the ball valve is raised from its seat, fluid from the inlet passage 2 flows by way of the passage 5 in the bushing, past the ball valve through ports 14, chamber 13 and ports 15 to the interior of the tubular portion 8 of the bushing and raises the valve 11 out of engagement with the seat rib 12. Fluid now flows past the valve 11, by way of the spaces between the projections 17, and then flows past the upper end of the sleeve 10 of the bushing to the outlet passage 3.

It will here be noted that when the ball valve 7 is raised from its seat by fluid under pressure in passage 5, it moves into the recess 22 in the projection 21 into close contact with the rubber composition. The rubber composition has inherent high frictional resistance qualities, so that when the ball valve is moved into close contact therewith, it prevents the valve from turning or spinning. By making the recess conform to the shape of the ball valve, a sufficient area of the ball is engaged to insure against the turning of the valve relative to the bushing 4.

When the ball valve 7 and the valve 11 are both seated as shown in Fig. 1, there is a clearance space between the ball valve and the end of the adjacent projection 21 of the valve 11. This clearance space is provided for the purpose of permitting the valve 11 to seal against the seat rib 12 without interference by the ball valve 7. This space also permits the ball valve to rotate as it moves away from the projection 21 and toward the valve seat 6 in closing to prevent back flow of fluid. Such rotary movement of the valve will of course be very slight but will be sufficient to insure against the same portion of the valve engaging the seat 6 each time the valve moves to its seated position and will thus prevent uneven wear of the ball valve and as a consequence insure the proper seating of the valve.

Since, as just described, the clearance space between the valves 11 and 7 is for the purpose of permitting the proper seating of the valve 11 and to permit the valve 7 to rotate from the time it moves out of engagement with the projection 21 until it engages the valve seat 6, such space, as illustrated in Fig. 1, need only be very slight.

When the ball valve is moved from its seat by fluid under pressure in the passage 5, the flow of fluid from said passage may impart rotary movement to the valve, but since the valve will move into engagement with the projection 21 very quickly after it moves from the seat 6, such rotary movement cannot be at such a fast rate that the ball valve and bushing 8 will be unduly worn or damaged due to the ball valve striking the inner surface of the tubular portion of the bushing.

During the time the ball valve 7 is out of engagement with the seat 6, fluid flows around said valve by way of ports 14, chamber 13 and ports 15 and since, due to the flow communication just traced, the fluid flowing past the ball valve does not act on the valve, the tendency of the valve to rotate or spin before or after it comes in contact with the projection 21 is reduced to a minimum.

In Fig. 4 of the drawing a check valve device is illustrated having a single check valve 7 and embodying the invention.

In this device the member 11 does not act as a check valve and due to this the seat rib 12 has been omitted. The sleeve portion 10 of the bushing 4 is provided with an annular stop shoulder 25 which is adapted to engage the lugs 17 of the member 11 and thereby limit movement of the member 11 in the direction toward the ball valve 7. Aside for the omission of the annular seat rib 12 and the addition of the stop shoulder 25, the construction and arrangement of the several parts of the check valve device illustrated in Fig. 4 may be identical with those illustrated in Figs. 1 to 3 inclusive.

It will be understood that in neither of the check valve devices shown is it possible for the ball valve 7 to be moved upwardly far enough to close the ports 15 in the bushing 4, thus the free flow of fluid from inlet passage to the outlet passage is insured.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a ball valve device comprising a casing having a fluid conducting communication therethrough, a valve seat, a ball valve adapted to engage said seat to close said communication against flow of fluid in one direction and movable away from said seat by the flow of fluid in another direction, and means having high frictional resisting characteristics adapted to engage said valve when the valve is moved from said seat to maintain the valve against rotation.

2. In a ball valve device comprising a casing having a fluid conducting communication therethrough, a valve seat, a ball valve adapted to engage said seat to close said communication against flow of fluid in one direction and movable away from said seat by the flow of fluid in another direction, and means having a rubber composition friction face adapted to engage said valve when the valve is moved from said seat to maintain the valve against rotation.

3. In a ball valve device comprising a casing having a fluid conducting communication therethrough, a valve seat, a ball valve adapted to engage said seat to close said communication against flow of fluid in one direction and movable away from said seat by the flow of fluid in another direction, and a rubber composition member adapted to frictionally engage said valve when the valve is moved from said seat to prevent the valve from spinning.

4. In a ball valve device comprising a casing having a fluid conducting communication therethrough, two valve seats arranged one in advance of the other, a ball valve adapted to engage one of said seats, a poppet valve adapted to engage the other of said seats, both of said valves, when seated, closing said communication against flow of fluid in one direction and being movable away from their respective seats by the flow of fluid in another direction, and a projection carried by the poppet valve adapted to frictionally engage said ball valve to prevent the ball valve from spinning when it is out of engagement with its seat.

5. In a ball valve device comprising a casing having a fluid conducting communication therethrough, two valve seats arranged one in advance of the other, a ball valve adapted to engage one of said seats, a poppet valve adapted to engage the other of said seats, both of said valves, when seated, closing said communication against flow of fluid in one direction and being movable away from their respective seats by the flow of fluid in another direction, and a projection carried by the poppet valve having a concave face substantially to the shape and size of a portion of said ball valve adapted to frictionally engage the ball valve to prevent the ball valve from spinning when it is out of engagement with its seat.

6. In a ball valve device comprising a casing having a fluid conducting communication therethrough, two valve seats arranged one in advance of the other, a ball valve adapted to engage one of said seats, a poppet valve adapted to engage the other of said seats, both of said valves, when seated, closing said communication against flow of fluid in one direction and being movable away from their respective seats by the flow of fluid in another direction, and a concave face on the poppet valve adapted to frictionally engage the ball valve to prevent the ball valve from spinning when it is out of engagement with its seat.

7. In a ball valve device comprising a casing having an inlet passage and an outlet passage, valve seats, a ball valve adapted to engage one of said seats and another valve adapted to engage the other of said seats to close communication from the outlet passage to the inlet passage and being movable away from their respective seats by fluid from said inlet passage, a guide for said ball valve, a communication through which fluid is adapted to be by-passed around said ball valve when the valve is out of engagement with said seat, said communication comprising an inlet port arranged adjacent the valve seat and opening into the interior of said guide portion and an outlet port spaced from said inlet port and opening into the interior of the guide portion at a point intermediate said valves, and means carried by said other valve for preventing said ball valve when it is moved from its seat from closing said outlet port.

8. In a ball valve device comprising a casing having an inlet passage and an outlet passage, valve seats, a ball valve adapted to engage one of said seats and another valve adapted to engage the other of said seats to close communication from the outlet passage to the inlet passage and being movable away from their seats by fluid from said inlet passage, a guide for said ball valve, a communication through which fluid is adapted to be by-passed around said valve to lessen the tendency of fluid to rotate said ball valve when the ball valve is moved from its seat, said other valve being interposed between said communication and outlet passage, and means carried by said other valve adapted for frictionally engaging said ball valve after it has been moved from its seat to prevent the ball valve from rotating.

9. In a ball valve device comprising a casing having an inlet passage and an outlet passage, a valve seat, a ball valve adapted to engage said seat to close communication from the outlet passage to the inlet passage and being movable away from its seat by fluid from said inlet passage, a guide for said ball valve, a communication through which fluid is adapted to be by-passed around said valve to lessen the tendency of fluid to rotate said valve when the valve is out of engagement with said seat, said communication comprising an inlet port arranged adjacent the valve seat and opening into the interior of said guide portion and an outlet port spaced from said inlet port and opening into the interior of the guide portion, another valve interposed between said outlet passage and outlet port adapted to prevent flow of fluid from the outlet passage to said communication and to permit flow of fluid from the communication to the outlet passage, and means carried by said other valve for preventing said ball valve when it is moved from said seat from closing said outlet port and for engaging the ball valve to prevent the ball valve from rotating.

10. In a ball valve device comprising a casing having an inlet passage and an outlet passage, a bushing mounted in said casing, a valve seat on said bushing, a tubular guide portion surrounding said seat, a ball valve having a sliding fit with the interior surface of said guide portion adapted to engage said seat to prevent flow of fluid from the outlet passage to the inlet passage and adapted to be moved from said seat by fluid in said inlet passage, a communication defined by said casing and the exterior surface of the tubular guide portion of the bushing through which fluid is by-passed around said valve when the valve is out of engagement with said seat, a valve interposed between the outlet end of said communication and said outlet passage adapted to prevent flow of fluid from the outlet passage to said communication and to permit flow of fluid from said communication to said outlet passage, and means carried by said valve extending into the interior of said tubular guide portion of the bushing adapted to frictionally engage the ball valve to prevent the ball valve from spinning after it has been moved out of engagement with said seat.

11. In a ball valve device comprising a casing having a fluid conducting communication therethrough, two valve seats arranged one in advance of the other, a ball valve adapted to engage one of said seats, a poppet valve adapted to engage the other of said seats, both of said valves, when seated, closing said communication against flow of fluid in one direction and being movable away from their respective seats by the flow of fluid in another direction, means carried by said poppet valve and extending from one side of the valve adapted to frictionally engage said ball valve to prevent the ball valve from rotating when the ball valve is out of engagement with said seat, and corresponding means extending from the other side of the poppet valve rendering the poppet valve reversible.

GLENN T. McCLURE.